United States Patent [19]

Naaman

[11] Patent Number: 5,353,605

[45] Date of Patent: Oct. 11, 1994

[54] PERSONAL AIR COOLING DEVICE

[75] Inventor: Chibbi Naaman, Yavne, Israel

[73] Assignee: Coolight Research & Development Ltd., Petah Tikua, Israel

[21] Appl. No.: 113,129

[22] Filed: Aug. 30, 1993

[30] Foreign Application Priority Data

Oct. 28, 1992 [IL] Israel ................................. 103574

[51] Int. Cl.⁵ ............................................. F25D 23/12
[52] U.S. Cl. .................................... 62/259.3; 2/171.3; 454/370; 607/109; 607/110
[58] Field of Search .................... 62/259.3; 2/171.3; 607/104, 109, 110; 165/46; 454/370

[56] References Cited

U.S. PATENT DOCUMENTS

| | | | |
|---|---|---|---|
| 2,460,269 | 2/1949 | Appeldoorn | 62/259.3 X |
| 3,657,740 | 4/1972 | Cialone | 2/171.3 X |
| 4,998,415 | 3/1991 | Larsen | 62/259.3 X |
| 5,050,240 | 9/1991 | Sayre | 2/171.3 X |
| 5,146,757 | 9/1992 | Dearing | 62/259.3 X |
| 5,193,347 | 3/1993 | Apisdorf | 62/259.3 X |
| 5,197,294 | 3/1993 | Galvan et al. | 62/259.3 X |

*Primary Examiner*—William E. Tapolcai
*Attorney, Agent, or Firm*—Benjamin J. Barish

[57] ABSTRACT

An air cooling device includes a headwear to be worn on a user's head, a nozzle carried by the headwear such as to be located in the user's mouth-nose region when the headwear is worn, and air tubing connected at one end to the nozzle and connectible at the opposite end to a source of cooled air for directing a stream of the cooled air via the nozzle to the user's mouth-nose region to cool the air inhaled by the user.

19 Claims, 1 Drawing Sheet

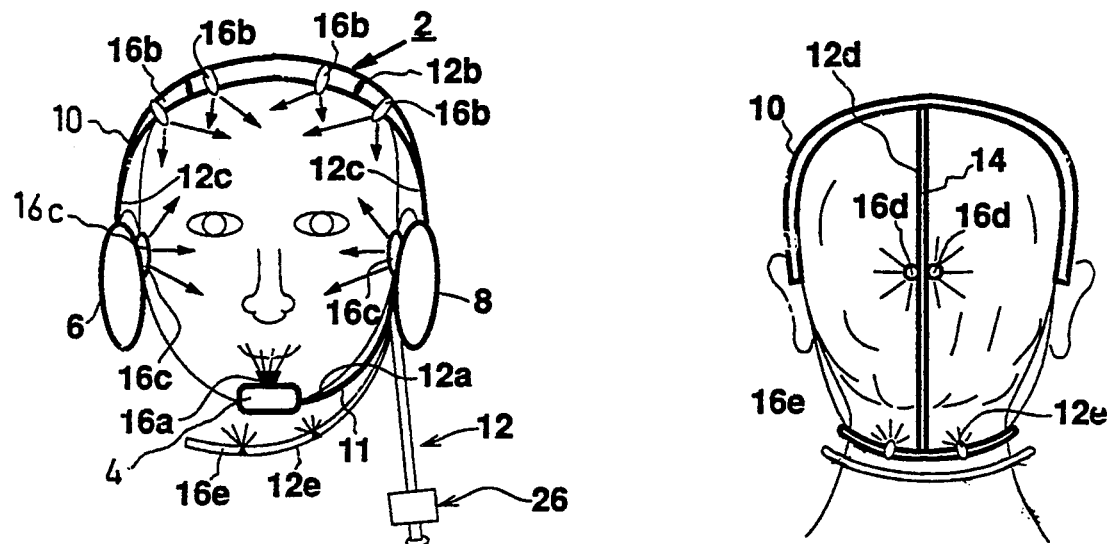
FIG. 1
FIG. 2
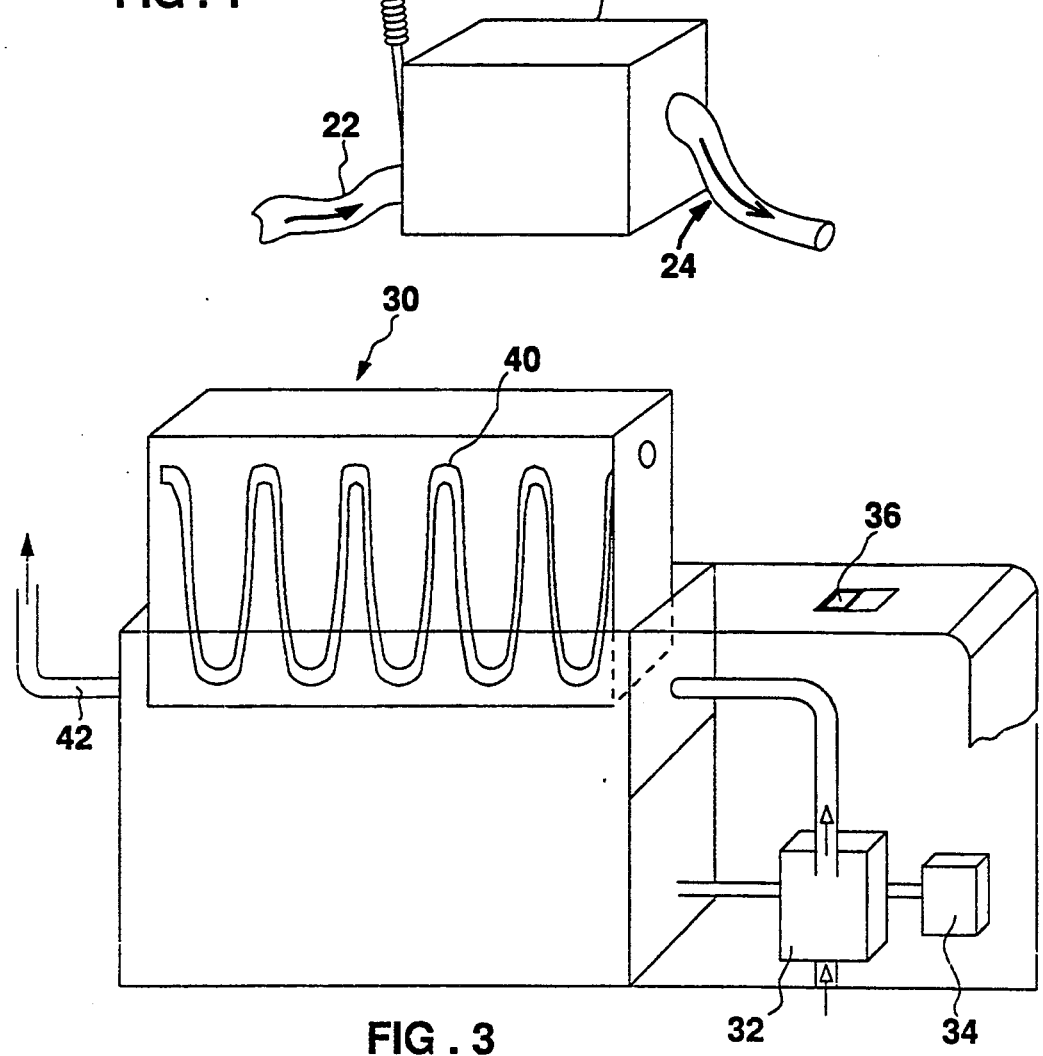
FIG. 3

PERSONAL AIR COOLING DEVICE

FIELD AND BACKGROUND OF THE INVENTION

The present invention relates to air cooling devices, and particularly to a personal air cooling device which may be worn by the person to be cooled by the device.

Many types of air cooling devices and systems have been developed. Most air cooling devices are designed to cool an enclosed space, for example, rooms of a building, the cockpit of an aircraft, etc. Such air cooling devices must therefore be capable of cooling a relatively large volume of air. Personal air cooling devices are known in which a small volume of air is to be cooled, e.g., airconditioning suits or helmets to be worn by the user. Such personal devices, however, are also large and bulky and therefore tend to interfere with the free movements of the user and/or require relatively large power sources.

OBJECTS AND BRIEF SUMMARY OF THE INVENTION

An object of the present invention is to provide a personal air cooling device having advantages in one or more of the above respects.

According to the present invention, there is provided an air cooling device, comprising: a headband to be worn by a user by applying the headband across the top of the user's head leaving the user's face uncovered; a nozzle carried by the headband such as to be located in the user's mouth-nose region when the headwear is worn; and air tubing connected at one end to the nozzle and connectible at the opposite end to a source of cooled air for directing a stream of the cooled air via the nozzle to the user's mouth-nose region to cool the air inhaled by the user.

According to further features in the described preferred embodiment, the headband includes further nozzles such as to be located in the vicinity of the user's forehead when the headband is worn, and coupled to the air tubing for directing streams of the cooled air also to the user's forehead.

It will thus be seen that an air cooling device constructed in accordance with the foregoing features needs to cool much smaller volumes of air than the previously known devices since the cooled air is applied not generally to an enclosed space, but rather locally to selected regions of the user. It has been found that providing a nozzle in the vicinity of the user's mouth or nose for cooling the air inhaled by the user produces physiological benefits, and that providing the further nozzles for applying the cooling air also to the user's forehead produces psychological benefits. The overall effect is that the user not only can physiologically tolerate higher temperatures, but also psychologically feels more comfortable under the higher temperatures.

Moreover, using nozzles for cooling these particular local areas enables the device to have a compact lightweight construction which does not interfere with the normal activities of the user; it also decreases the power supply required to cool the air, thereby enhancing portability by enabling batteries to be used for this purpose.

According to further features in the described preferred embodiments, nozzles may also be provided for applying streams of cooled air to the user's temples, to the user's neck, and/or to the back of the user's head.

According to further features in the described preferred embodiment, the headband includes a mouth microphone, and the nozzle cooling the inhaled air is carried by the mouth microphone. The headband preferably also includes a plurality of nozzles for directing the cooled air to the user's forehead a pair of earphones carrying a further plurality of nozzles, a neckband extending at least partly around the user's neck and carrying a still further plurality of nozzles, and/or a further band extending across the back of the user's head and also carrying a further plurality of nozzles, all of which nozzles may be coupled to the tubing for directing further localized streams of the cooled air to other localized regions of the user's head or neck.

According to further features in one described preferred embodiment, the source of cooled air includes a cartridge containing a phase-changing cooling material, and a pump for pumping air to the tubing via the cartridge. Preferably, the headband and the source of cooled air are both portable and include a battery for operating the pump.

A cooling device constructed in accordance with the foregoing features is particularly useful by an aircraft pilot with the tubing plugged into the supply of cold air normally included in the pilot's cockpit. The device, however, may also be used by a fire fighter to enable the user to withstand exceptionally high temperatures. Other possible uses of the device are by surgeons subjected to the high temperature of the operating lights, and by other persons to provide a more comfortable feeling under particularly hot conditions.

Further features and advantages of the invention will be apparent from the description below.

BRIEF DESCRIPTION OF THE DRAWINGS

The invention is herein described, by way of example only, with reference to the accompanying drawings, wherein:

FIG. 1 schematically illustrates one form of cooling device constructed in accordance with the present invention;

FIG. 2 is a rear view of the headwear portion of the cooling device of FIG. 1; and FIG. 3 illustrates another form of cooling unit which may be used in the cooling device of FIGS. 1 and 2.

DESCRIPTION OF PREFERRED EMBODIMENTS

The personalized air cooling device illustrated in FIGS. 1 and 2 comprises a headset, generally designated 2, such as may be worn by a pilot, to include a mouth microphone 4 and a pair of earphones 6, 8. The illustrated headset 2 may be made of springy metal or plastic strips of any suitable construction. As illustrated in FIGS. 1 and 2, it includes a headband 10 extending over the top of the user's head and carrying the two earphones, 6, 8, at its opposite ends. The mouth microphone 4 is mounted at the end of a strip 11 extending from one end of the band 10.

The headset 2 carries tubing, generally designated 12, connectible to a source of cooled air 14. Tubing 12 is formed with a plurality of nozzles located so as to direct cooled air from the cooling unit 14 to local, selected regions of the user's face, neck and back of the user's head.

Thus, tubing 12 includes a tube section 12a supported by the microphone 4, or by the microphone mounting strip 11, and carries a nozzle 16a to direct a stream of cooled air to the vicinity of the user's mouth-nose to cool the air inhaled by the user. Tubing 12 includes another tube section 12b supported by the band 10 and carries a plurality of nozzles, as shown at 16b, for directing streams of the cooled air to the user's forehead. Tubing 12 includes additional tube sections 12c supported by or in the vicinity of the earphones 6, 8 and formed with nozzles 16c located in the vicinity of the user's temples so as to direct streams of cooled air to the user's temples.

Tubing 12 further includes a tube section 12d extending across the back of the user's head (FIG. 2) and formed with nozzles 16d for directing a stream or streams of cooled air across the back of the user's head, and a further tube section 12e extending at least partly around the user's neck and carrying nozzles 16e for directing streams of cooled air to the user's neck. Tube section 12d may be a length of tube supported between the headset band 10 and the microphone mounting strip 11, or may be supported on resilient strips attached between members 10 and 11. Similarly, tube sections 12e may be attached to the ends of the headband 10 or may be supported by a separate band secured to the headband 10.

All the nozzles 16a–16e may be merely small holes formed in the tubing, or housings attached to the tubing and formed with such holes, for directing and concentrating streams of air to the respective localized regions of the user's face, head and neck as described above.

The personal air cooling device illustrated in FIGS. 1 and 2 is particularly useful for a pilot of an aircraft. In such case, the air cooling unit 14 would be an electrical unit normally provided in the cockpit of the aircraft and having an outlet 20 for the cool air. External air enters the air cooling unit 14 via an inlet 22, and the spent air may be exhausted from the cabin via an exhaust 24. Preferably, the air tubing 12 to the headset 2 is connected to the cool air outlet 20 via a quickly attachable/detachable connector 26.

FIG. 3 illustrates another type of air cooling unit that may be used instead of the air cooling unit 14 in FIGS. 1 and 2, particularly where portability is desired, such as used by a fire fighter or the like. In this case, the air is cooled by a cartridge, generally designated 30, containing a phase-changing cooling material, e.g., of the type used in home-making ice cream. Such a cartridge may be placed in the freezer so as to be in a standby frozen condition, and when it is to be used, it is removed from the freezer and connected to the tubing 12 in the airconditioning device illustrated in FIGS. 1 and 2.

The air cooling unit illustrated in FIG. 3 includes, in addition to the cartridge 30 of phase changing material, also an airpump 32 energized by a battery 34 when an electrical switch 36 is closed. The cartridge 30 of phase changing material is formed with an elongated heat-exchange passageway 40 through which the air is pumped by pump 32. The air is thus cooled before it is outletted via outlet 42 to the tubing 12 in the headset 2 illustrated in FIGS. 1 and 2.

Such a headset, including the air cooling unit of FIG. 3, can be constructed as a light, compact portable unit which can be easily carried by a fire fighter or other person that may be subjected to high temperatures. The cooling unit needs to cool only relatively small volumes of air because of the localized application of the cooled air to selected regions of the user's face. A relatively small battery 34 would thus be sufficient for operating the cooling unit particularly since the device uses a cartridge of phase-changing material which can be frozen before use and refrozen after use. In addition, the use of a headset for mounting the nozzles which produce the streams of cooled air applied to selected regions of the user's face, imposes a minimum of interference to the normal activities that might be required by the user.

What is claimed is:

1. An air cooling device, comprising: a headband to be worn by a user by applying the headband across the top of the user's head leaving the user's face uncovered; a nozzle carried by said headband such as to be located in the user's mouth-nose region when the headband is worn; and air tubing connected at one end to said nozzle and connectible at the opposite end to a source of cooled air for directing a localized stream of the cooled air via said nozzle to the user's mouth-nose region to cool the air inhaled by the user.

2. The device according to claim 1, wherein said headband includes further nozzles such as to be located in the vicinity of the user's forehead when the headband is worn, and coupled to said air tubing for directing streams of the cooled air also to the user's forehead.

3. The device according to claim 1, wherein said headband includes further nozzles such as to be located in the vicinity of the user's temples when the headband is worn, and coupled to said air tubing for directing streams of the cooled air also to the user's temples.

4. The device according to claim 1, wherein said headband includes further nozzles such as to be located in the vicinity of the user's neck when the headband is worn, and coupled to said air tubing for directing streams of the cooled air also to the user's neck.

5. The device according to claim 1, wherein said headband includes further nozzles such as to be located in the back of the user's head when the headband is worn, and coupled to said air tubing for directing streams of the cooled air also to the back of the user's head.

6. The device according to claim 1, wherein said headband includes a mouth microphone, and said nozzle is carried by said mouth microphone.

7. The device according to claim 1, wherein said headband includes a further plurality of nozzles located so as to direct localized streams of the cooled air also to the user's forehead.

8. The device according to claim 7, wherein said headband further includes a pair of earphones, said earphones carrying a further plurality of nozzles coupled to said air tubing for directing streams of the cooled air also to the user's temples.

9. The device according to claim 8, wherein said headband further includes a neckband extending at least partly around the user's neck, said neckband carrying a further plurality of nozzles coupled to said air tubing for directing streams of the cooled air also to the user's neck.

10. The device according to claim 9, wherein said headband further includes a band extending across the back of the user's head, said latter band carrying a further plurality of nozzles for directing streams of the cooled air to the back of the user's head.

11. The device according to claim 1, wherein said opposite end of the tubing includes a connector for connecting it to a source of cooled air.

12. The device according to claim 1, in combination with a source of cooled air connected to said opposite end of the tubing.

13. The device according to claim 12, wherein said source of cooled air includes a cartridge containing a phase-changing cooling material, and a pump for pumping air to said tubing via said cartridge.

14. The device according to claim 13, wherein said headband and said source of cooled air are both portable and include a battery for operating said pump.

15. An air cooling device, comprising: headband to be worn by a user by applying it across the top of the user's head; a nozzle carried by said headband such as to be located in the user's mouth-nose region when the headwear is worn; air tubing connected at one end to said nozzle and connectible at the opposite end to a source of cooled air for directing a localized stream of the cooled air via said nozzle to the user's mouth-nose region to cool the air inhaled by the user; and a plurality of further nozzles carried by said headband and located so as to direct localized streams of the cooled air also to the user's forehead.

16. The device according to claim 15, wherein said headband further includes a pair of earphones, said earphones carrying a further plurality of nozzles coupled to said air tubing for directing streams of the cooled air also to the user's temples.

17. The device according to claim 15, wherein said headband includes a mouth microphone, and said nozzle is carried by said mouth microphone.

18. The device according to claim 15, wherein said headband includes further nozzles such as to be located in the vicinity of the user's forehead when the headband is worn, and coupled to said air tubing for directing streams of the cooled air also to the user's forehead.

19. The device according to claim 15, wherein said headband includes further nozzles such as to be located in the vicinity of the user's temples when the headband is worn, and coupled to said air tubing for directing streams of the cooled air also to the user's temples.

* * * * *